United States Patent [19]

Hildebrandt et al.

[11] 4,145,930
[45] Mar. 27, 1979

[54] ARRANGEMENT FOR THE DETERMINATION OF THE CAGE ROTATIONAL SPEED AND BEARING SLIPPAGE OF ROLLER BEARINGS

[75] Inventors: Florian Hildebrandt, Günding; Heinrich F. Bauer, Eichenau; Gerhard Helbling, Munich, all of Fed. Rep. of Germany

[73] Assignee: Motoren- und Turbinen-Union Müchen GmbH, Munich, Fed. Rep. of Germany

[21] Appl. No.: 832,292

[22] Filed: Sep. 12, 1977

[30] Foreign Application Priority Data

Sep. 18, 1976 [DE] Fed. Rep. of Germany ....... 2642045

[51] Int. Cl.² .............................................. G01P 3/02
[52] U.S. Cl. ......................................... 73/518; 73/593
[58] Field of Search .................. 73/518, 593, 144, 140

[56] References Cited

U.S. PATENT DOCUMENTS

| | | | |
|---|---|---|---|
| 2,367,017 | 1/1945 | Gardiner | 73/140 |
| 2,952,807 | 9/1960 | Heller | 73/518 |
| 3,499,306 | 3/1970 | Pearson | 73/144 |
| 4,024,755 | 5/1977 | Quehen | 73/105 |

FOREIGN PATENT DOCUMENTS

790057  2/1958  United Kingdom ..................... 73/140

*Primary Examiner*—Anthony V. Ciarlante
*Attorney, Agent, or Firm*—Scully, Scott, Murphy & Presser

[57] ABSTRACT

Arrangement for determining cage rotational speed and bearing slippage for roller bearings by sensors mounted on a weakened location formed in a stationary component of the bearing during operation of the latter. The sensors measure the frequency of the dynamic deflection at the weakened location on the bearing caused by the bearing roll bodies rolling over the location, which can be calculated and analyzed to provide the required results.

2 Claims, 4 Drawing Figures

VIEW A

VIEW A

ARRANGEMENT FOR THE DETERMINATION OF THE CAGE ROTATIONAL SPEED AND BEARING SLIPPAGE OF ROLLER BEARINGS

BACKGROUND OF THE INVENTION

1. Field of the Invention

The present invention relates to an arrangement for the determination of the cage rotational speed and the bearing slippage for roller bearings with the utilization of sensors.

2. Discussion of the Prior Art

Currently known methods are predicated on either the marking of the cage detectable by the measuring technology or one of the individual roll bodies. In the first instance, the cage is bored and provided with one or more small magnetized pins which rotate past an induction coil. The generated impulses are electronically counted and compared with the rotational speed of the shaft. The second method magnetizes an individual roll body itself, or exposes the latter to intensive radioactive radiation, and then counts the individual rotations without any physical contact.

Both methods are subjected to certain restrictions: Thus, they require a relatively large amount of space for the building in of the receiver, and are limited by the temperature (insulation of the induction coil, respectively, Curie-point at magnetizing). For the bored or drilled cage, its rotational stability is greatly impaired. After the magnetizing, the sensors collect ferrous or iron-containing particles on their surface, and thereby reduce their life expectancy. For an activated bearing, extensive safety considerations must be observed in the handling of the radioactive material. The power of analysis for both methods is limited to about 1 cage revolution. An oscillating bearing slippage having a period or cycle which lies therebelow cannot be determined.

SUMMARY OF THE INVENTION

Accordingly, it is an object of the present invention to eliminate the limitations and disadvantages encountered in the prior art, and to provide an arrangement which, without additional spatial requirements and independently of rotational speed and operating temperature, will determine the cage rotational speed and, resultingly, the bearing slippage for roller bearings.

For this purpose, in an inventive manner, the stationary component of the roller bearing, in most instances the outer ring, is at one location artificially somewhat weakened or reworked in proximity to the roll body rolling path. The running geometry and life expectancy remain thereby almost completely unaffected. Each of the roll bodies rolling over the artificial or simulated weakening location causes a distinct deflection or resilient bending of the weak point, which can be measured by means of suitable sensors. Preferred are strain gauge strips or high temperature-strain gauge strips, which can be easily applied to the worked free locations. The sensors may be arranged in quarter-, half- or full-bridge electrical circuits, whose active elements are located to extend in the circumferential direction. The electrical signals of the strain gauge strips generated upon over-rolling by the roll bodies are processed further and electronically counted. The ability for analysis in the measurement of the cage slippage is now primarily limited only by the number of the roll bodies, and thusly increases by the tenth power.

BRIEF DESCRIPTION OF THE DRAWINGS

The invention is now described in detail hereinbelow, taken in conjunction with the accompanying drawings; in which.

DETAILED DESCRIPTION

Figure 1:
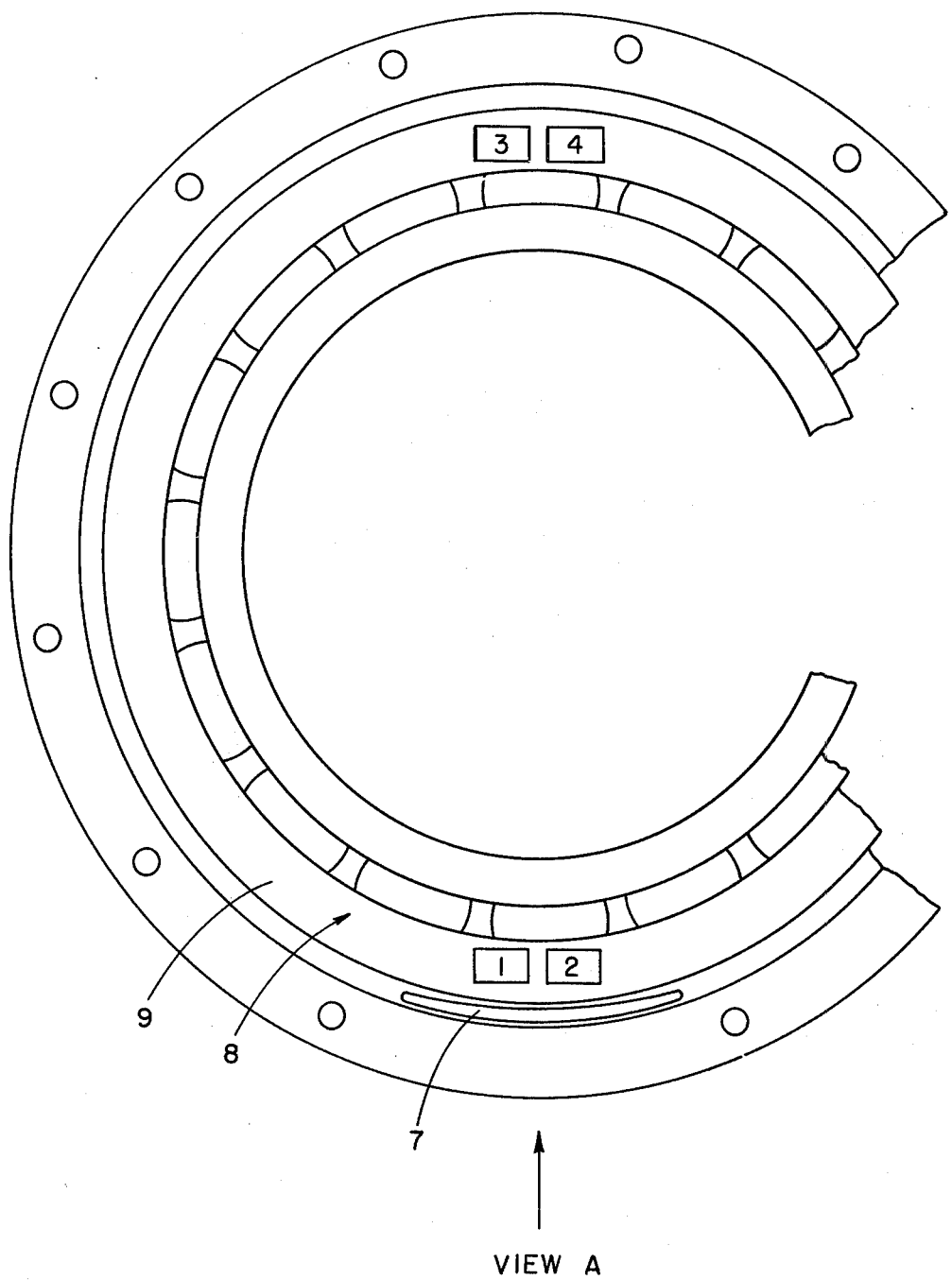
FIG. 1 shows a front view of a roller bearing constructed in a cup shape, which illustrates the position of the strain gauge strips and the position of the onesided recess provided in the support sleeve.
Figure 2:
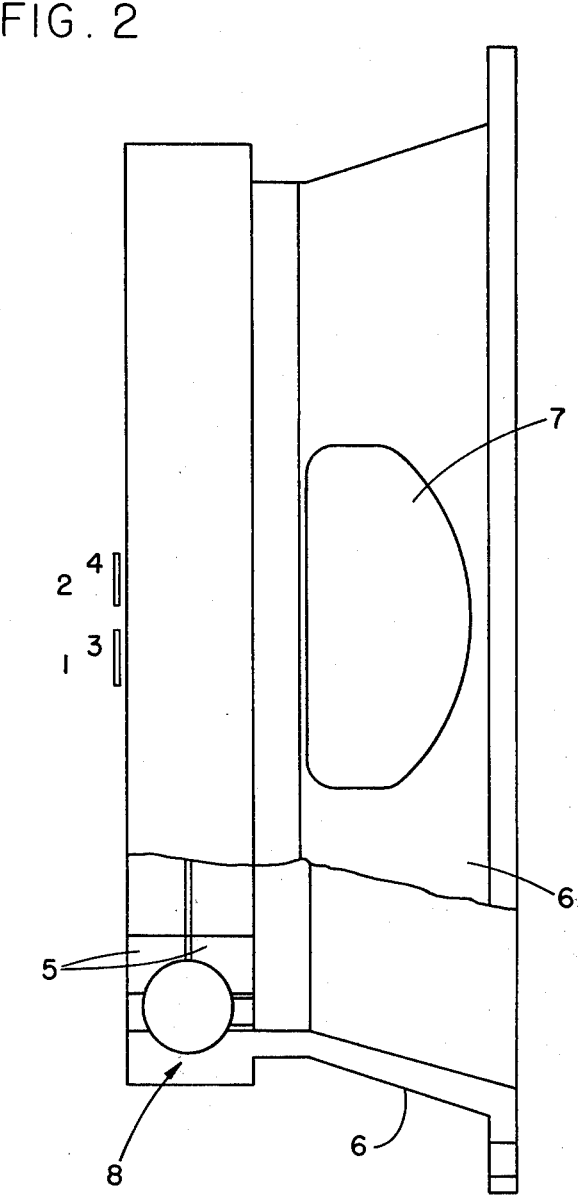
FIG. 2 shows the roller bearing construction, partly in section, in the direction of view A in FIG. 1.

FIGS. 1 and 2 of the drawings illustrate a roller bearing adapted for carrying out of the invention, including a divided inner race 5, a flange-mountable, cup-shaped support member or cone 6 containing the outer bearing ring 8, and balls or rollers 10. The weak point is formed by a cutout or artificially produced weak point 7 in one side of the support member 6.

Figure 3:
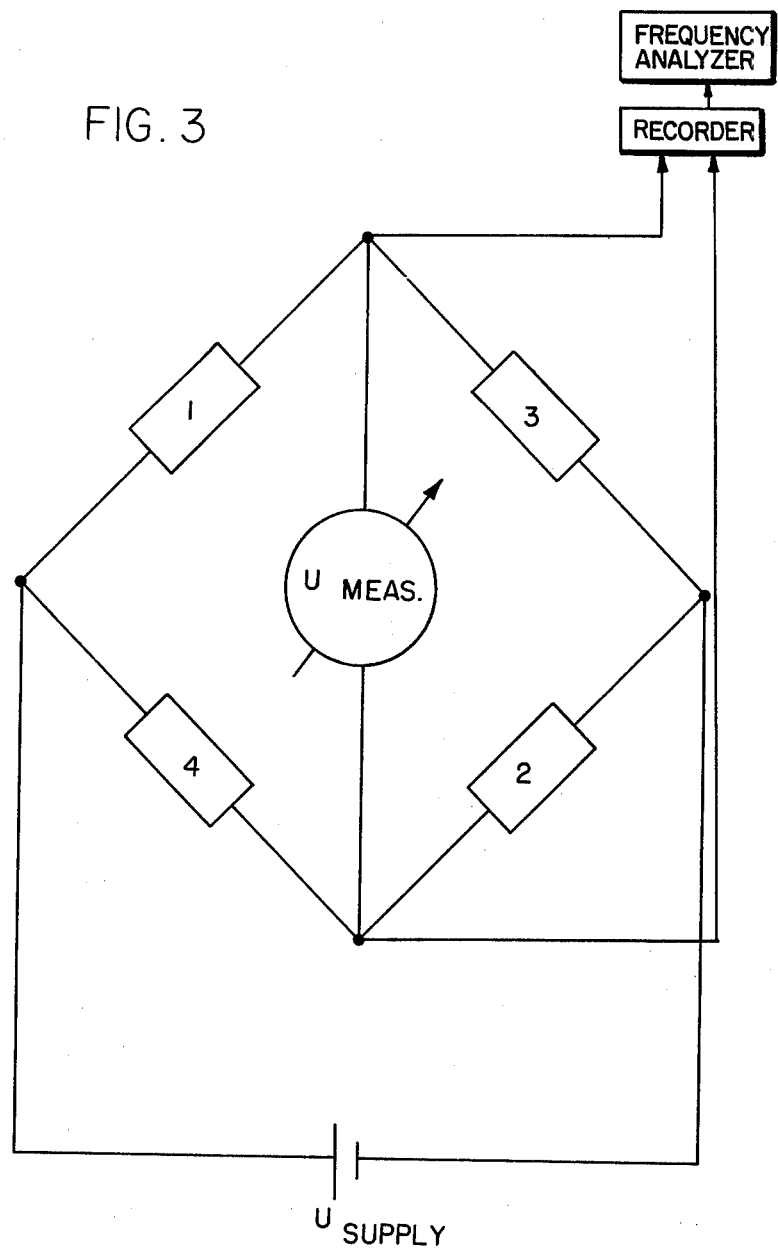
FIG. 3 shows a full bridge circuit associated with the roller bearing of FIGS. 1 and 2.

In order to be able to measure the frequency of the dynamic deflection at the cutont 7 during the roller bodies over-roll as a measure for the cage rotational speed, respectively, the bearing slippage, the roller bearing of FIGS. 1 and 2 has associated therewith a strain gauge strip-full bridge of high temperature resistance, as shown in FIG. 3, whose active sensors 1, 2 are mounted on the end surface on the median diameter of the outer bearing ring 8, in the circumferential direction median of the cutout 7, and precisely oppositely thereof there are mounted the compensating strips 3, 4 considering a even number of roll bodies, on the median diameter of the outer bearing ring 8.

For an odd number of roll bodies, respectively, ball bearings, the compensating strips are displaced by a one-half ball spacing.

In lieu of the full bridge circuit for the active sensors, respectively, compensating strips selected in accordance with the embodiment of FIG. 3, it is comtemplated that it is possible, within the scope of the invention, to arrange the sensors in quarter- or half-bridge circuits.

Figure 4:
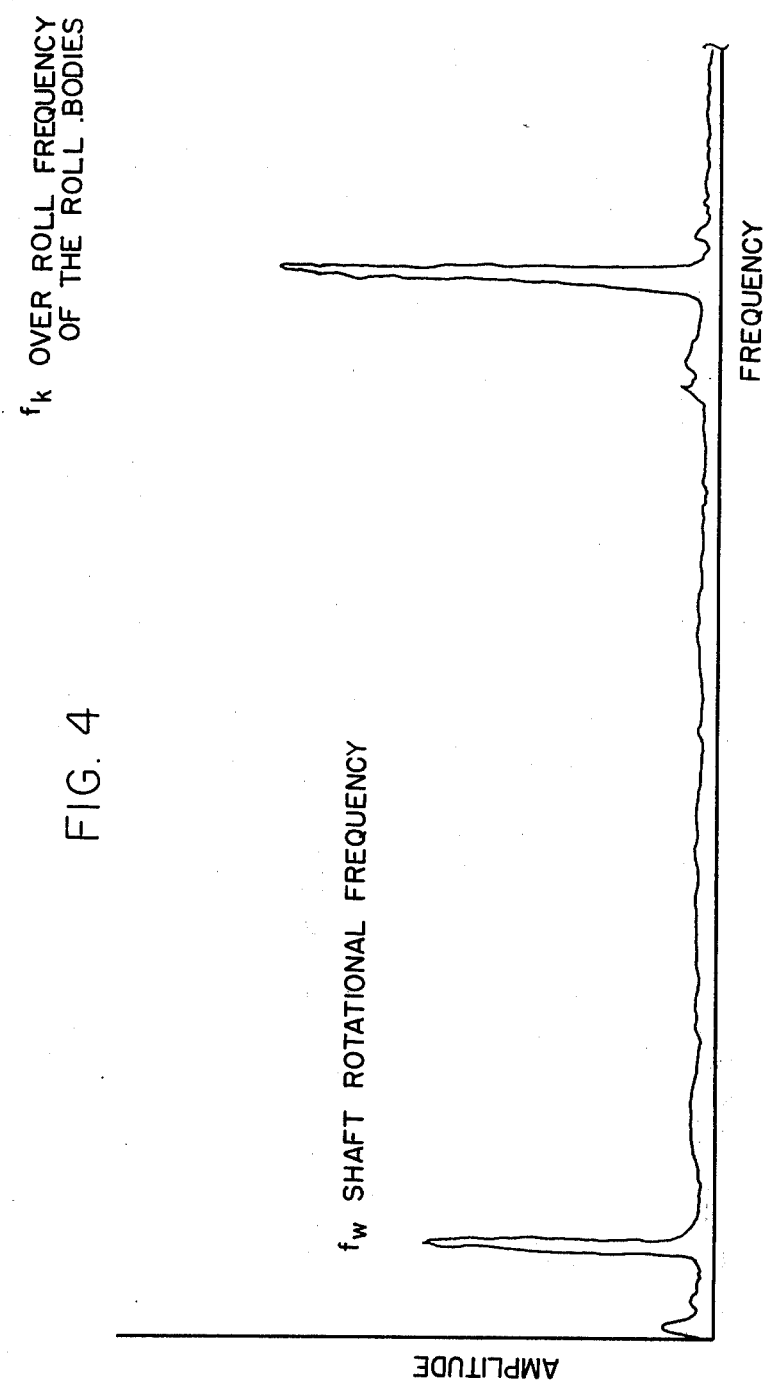
FIG. 4 shows a graph in which there are illustrated the two resonance peaks (shaft rotational frequency, respectively, over-roll frequency of the roll bodies) occurring during the frequency analysis.

The wideband recorded measuring signal of the strain gauge strip-full bridge is subjected to a frequency analysis for determination of the cage rotational speed, and best so in a real time analyzer. The result is illustrated in the graph according to FIG. 4. There occur two resonance peaks:

The lower-frequencied shaft rotational speed frequency $f_W$ is directly proportional to the 1st magnitude of the shaft rotational speed and is caused by the residual imbalance of the rotating components, whereby $f_K$ results from the over-roll frequency of the roll bodies. Thereby there is calculated the relative cage rotational speed as:

$$n \text{ Cage}/n \text{ Shaft} = f_K/(a \cdot f_W)$$

wherein $f_K$ = the roll body over-roll frequency (Hz)
$f_W$ = the shaft rotational frequency (Hz)
$a$ = the number of the roll bodies (—).

When an oscillating slippage occurs, it impresses itself in a change in the timed period or interval between two roll body over-roll impulses which, finally, leads to a frequency modulation of the signal. In order to evaluate the oscillating bearing slippage, for this purpose there may be applied demodulating or discriminating methods.

What is claimed is:

1. In an arrangement for the determination of the bearing cage rotational speed and the bearing slippage for roller bearings, including sensors for effectuation of the rotational speed determination, the improvement comprising: said roller bearing having a stationary component during operation thereof, an artificially produced weak point being formed in said stationary component, said sensors being located on said stationary component at said artificially produced weak point, and means for analyzing the frequency of the dynamic deflection at said artificially produced weak point at over-roll by individual roll bodies so as to provide a measure for the cage rotational speed and bearing slippage.

2. An arrangement as claimed in claim 1, said sensors comprising strain gauge strips.

* * * * *